SENSE AMPLIFIER
Filed April 6, 1964
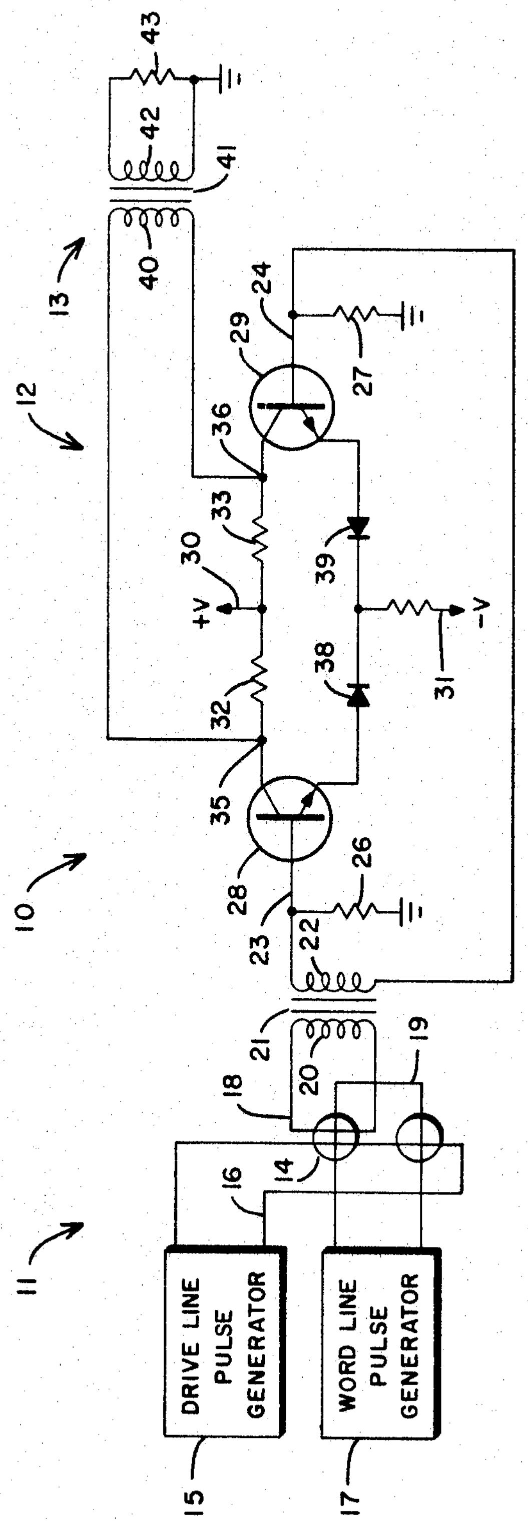
INVENTOR.
JOHN W. STAUBUS
BY
Meyers & Peterson
ATTORNEYS

United States Patent Office 3,392,346

Patented July 9, 1968

3,392,346

SENSE AMPLIFIER

John W. Staubus, Minneapolis, Minn., assignor to Sperry Rand Corporation, New York, N.Y., a corporation of Delaware Filed Apr. 6, 1964, Ser. No. 357,440

4 Claims. (Cl. 330—69)

ABSTRACT OF THE DISCLOSURE

A difference amplifier having current limiting means such as oppositely poled diodes in series with the common emitter leads of the two transistors forming the difference amplifier whereby the current in the common emitter circuit is limited thus preventing burn-out of the transistors when large transient currents are present.

The present invention relates generally to a sense amplifier, and more particularly to a difference amplifier which is adapted for use in connection with magnetic memory devices, such as are commonly employed in connection with digital type data processing systems and the like.

In data processing systems, magnetic memories or cores are frequently employed for storage of information. This information is normally manifested by the directional orientation of the remnant magnetic state of the core. In operation of the system, it is necessary to obtain this stored information from time-to-time by way of read-out or the like, and then obtain a useful signal indicative of the nature of the stored information. During read-out, particularly non-destructive sensing or read-out, the core is subjected to an interogation or drive pulse having a field along a certain predetermined magnetic direction relative to the core, and the response of the core to this interrogation pulse constitutes the information signal. The information signal from the memory device is normally inductively linked to a sense line, and the sense line receiving this signal is coupled across the primary of a transformer. In accordance with the present invention, the secondary of this transformer is utilized to drive a difference amplifier, and the output of the difference amplifier may be utilized in a load device. In the inductive linking of an interrogation winding to a magnetic core, and the similar linking of this core to a sense winding, noise signals frequently occur which tend to obscure the information signal which is obtained solely from switching or modification of the remnant magnetic state of the memory core or device. In order to accommodate the noise, and segregate the useful information signal therefrom, a difference amplifier is employed since this type of device will provide a cancellation of unwanted noise, to the benefit of the information signal. This information signal will then appear across the output of the difference amplifier, and the polarity or the sense of this signal will accordingly be indicative of the nature of the information held within the memory core being interrogated.

Although ferrite cores or the like may be employed, thin films operating in the non-destructive sensing mode are generally preferred for memories with rapid switching and read-out requirements. Thin film memories in non-destructive sensing modes normally perform with an output signal having a reasonably sharp peak, and this output signal is normally fed to the primary of a transformer. The secondary of the transformer is coupled to an amplifier. As indicated, the nature of the noise induced in a memory system makes it desirable to employ a difference amplifier in order to obtain cancellation of this noise. Because of their inherent advantages in amplifiers for this type of operation, solid state asymmetrical current translating devices such as transistors are generally preferred over vacuum tubes and hence the difference amplifier utilized is preferably transistorized. During normal operation of the memory system, the core will be sensed in a non-destructive manner. However, during normal operation it is recognized that the state of the core must necessarily be switched from time to time when the nature of the information retained in the individual core is changed. Therefore, the sense line will be subjected to a strong signal based upon the complete 180° switching of remnant state of the core. This switching is preferably conducted in the rotational mode, and as such, the signal which is sensed by the sense winding is extremely sharp, and it is this operation which causes a substantial signal to be experienced at the inputs to the difference amplifier. Operation of the amplifier under these conditions may cause difficulty in the functioning or destruction of the transistor. A noise signal of this type including the sensing of the signal on the drive line may deliver an overload signal to the input of the amplifier and thereby cause damage or failure of the base to emitter junction of one of the transistors. In order to protect the transistor from this condition, each of the units in the symmetrical half of the difference amplifier is arranged in series with a unidirectional conducting device which has low impedance to current flow in the direction of the signal and normal output, but which has high impedance to current flow in an opposite direction of current flow. Thus, it is possible to utilize the apparatus with a normally encountered small signal, which signal will not be attenuated by the circuitry employed.

In this regard, a difference amplifier is established wherein a pair of symmetrical halves are arranged on opposite sides of unidirectional positive and negative potential sources. Suitable resistors or other impedance means are interposed between the sources of potential in order to control and monitor the current flow through the difference amplifier and in order to suitably balance each of the symmetrical halves. A transistor is interposed in series with the resistors of each symmetrical half, and a signal input means and an output means are arranged in circuit with each transistor or other asymmetrical current translating device. Each half of the circuit further includes a second asymmetrical current conducting device which is adapted to have low impedance to one direction of current flow, and high impedance to the opposite direction of current flow, this device being interposed in a circuit leg which is common between the input means and output means of the asymmetrical current translating device or transistor. Thus, the arrangement provides low impedance to the normal input signal, thereby providing little or no attenuation thereof, and also provides low impedance to the normal output of the unit. By the same process, the system is protected from a large overload input signal or spike having a sharp leading edge, which in the environment employed would otherwise damage the structure of the semiconductor current translating device. Accordingly, this arrangement permits high signal voltage operation of the difference amplifier.

Therefore, it is an object of the present invention to provide an improved difference amplifier which is provided with a means for protecting the active circuit components thereof from damage due to an overload input signal which may be applied thereto.

It is a further object of the present invention to provide an improved difference amplifier for film memories and the like, which does not attenuate the input signal, and which is protected against damage due to an overload input.

It is still a further object of the present invention to provide an improved difference amplifier which is particularly adapted for use in connection with the sensing of magnetic memory elements, wherein the output of the magnetic memory being inductively linked to a sensing means for applying a signal to the input of the difference amplifier, the amplifier being particularly adapted for receiving the small input signal from the memory element, and being protected against a large overload input which may develop in this use environment.

Other and further objects of the present invention will become apparent to those skilled in the art upon a study of the following specification, appended claims, and accompanying drawing wherein the figure is a schematic diagram of a circuit employing a magnetic memory core, and wherein a difference amplifier arranged in accordance with the present invention is utilized to amplify the signal obtained from the core and apply the output to a load.

In accordance with the preferred embodiment of the present invention, a digital memory system generally designated 10 includes a core memory portion generally designated 11, a difference amplifier portion generally designated 12, and an output or load portion generally designated 13. Referring now to the memory portion 11, the arrangement includes thin film magnetic memory cores 14 and 15, which may be, for example, thin film of 83–17 Permalloy having a thickness of about 2,000 angstroms, with a diameter of about one centimeter. Films of this type may be fabricated according to the technique disclosed in the Rubens Patent No. 2,900,282. This film has an axis of anisotropy and also has magnetic remnance oriented along this axis according to a direction determined by the induction applied or provided thereto by a pulse from the interrogation pulse generator or driver 17. In order to read or sense the state of remnant magnetization existing in the film 14, the pulse is applied to the film by the word line driver 17, and the change in orientation of the film, if any, which occurs in the film 14 is sensed by a sense line such as conductor 18. In order to reduce the amount of noise which is inductively linked to the line 18 by the drive line conductor 19 of the word line pulse generator 17, the lines 18 and 19 cross the film core 15 at right angles, one to another. The axis of anisotropy is preferably substantially parallel to the word line conductor 19. The terminals of sense line 18 are connected across the primary 20 of the transformer 21, the secondary 22 being applied or taken across the two input lines 23 and 24 of the difference amplifier 12. The inputs 23 and 24, which are coupled to ground through the resistors 26 and 27, are fed to the base of the N-P-N transistors 28 and 29 respectively. Thus, the input to the difference amplifier 12 is applied across the base-emitter circuits of the individual transistors of the symmetrical halves thereof. The amplifier system includes a source of positive potential as at 30, together with a source of negative potential as at 31, the magnitude of the current flow between these sources being controlled, if desired, by the resistors 32 and 33 respectively. For balance in the symmetrical system, the resistors 32 and 33 are preferably precision resistors, however they may be variable or adjustable for establishing an overall balance in the circuit. The collector-emitter or output circuit of the individual current translating devices or transistors 28 and 29 carry the output current, the degree of conduction in the transistors 28 and 29 being manifested by the magnitude of the signal which appears at the output points 35 and 36.

Attention is now directed to diodes 38 and 39 which are used as current limiting means. These diodes are preferably matched and are arranged to carry the normal input and output of the transistors 28 and 29 in the low impedance direction. However, since the input to the transistors 28 and 29 is taken from a transformer, the primary of which is coupled to an inductive switching film 15, the transformer 20 may occasionally experience overload peaks in potential. The voltage applied across the inputs to the transistor must not exceed the breakdown voltage of the diodes which can easily be 75 volts or more. These overload conditions frequently occur during switching of the core, and they may be sufficient to damage the transistor. Therefore, the diodes 38 and 39 will prevent these high overload inputs from causing damage to the transistors, this being accomplished without attenuating the normal signal which is desired to be received. As indicated in the drawing, the diodes 38 and 39 are preferably forward-biased by a bias control network comprising voltage source 31 and its associated resistor to an extent such that they will receive the normal signal input with no attenuation thereof. However, the large noise signals induced in the sense line during rotational switching of the magnetic moments in the core by 180° will not be permitted to pass through the diodes due to the back-biasing action of the large noise signal. Thus, the amount of current through the diodes is limited to the normal signal input as determined by the bias control network. In addition to this feature, it has been found that the forward resistance of the diode changes with temperature. Thus, the gain of the amplifier is reduced at the high end and increased at the low end, thereby making the gain in the system more uniform across the temperature range which is expected to be encountered.

Referring now to the output portion 13 of the system, the output taps 35 and 36 are arranged across the primary 40 of the transformer 41, the secondary winding 42 of the transformer being grounded at one side and carried to a load represented by the resistor 43 at the other. Thus, a positive going signal which is applied along the input line 22 to transistor 28 will increase current conduction through transistor 28, and will cause a drop in potential to be experienced at the output tap 35. Simultaneously, a negative going signal will be applied to the input line 23, this tending to decrease current flow through transistor 29. If the current through one transistor increases by $\Delta i$, then the current through the other transistor decreases by a corresponding $\Delta i$ thus keeping the current relatively constant through the common emitter resistor. This difference will be reflected in a signal across the primary 40 of the transformer 41, and the result may be utilized at the load 43.

The driver 16 and the film memory core 15 are standard components and are available commercially. They are widely used in data processing systems currently in use in this country.

The function of the difference amplifier is to permit operation of the system as a common mode rejection arrangement, and the application of the diodes 38 and 39 permit the system to be used in a high voltage environment. While transistors such as N-P-N transistors have been suggested, it would be appreciated that other solid state asymmetrical current translating devices may be employed as well, such as P-N-P transistors and the like.

In order to provide a suitable amplifier system, the output of the film is applied to transformer 20, such as a 1:1 wide band transformer. The input resistors 26 and 27 are 10,000 ohms, and the transistors 28 and 29 are type 2N917. Voltage source 30 provides current at a potential of 7 volts, source 31 being at −7 volts. Resistors 32 and 33 are 1,800 ohms, and emitter resistor 34 has a value of 1,300 ohms. All of these components are readily commercially available. Pulse generators as used at 16 and 17 are standard components and are also commercially available.

It will, of course, be understood that various changes may be made in the form, details, arrangements and proportions of the parts without departing from the scope of the invention as set forth in the appended claims.

What is claimed is:

1. A difference amplifier comprising:

(a) first and second current translating devices each having at least emitting, control and collecting electrodes, (b) an input circuit coupled to said control electrode of each of said devices for receiving an input signal, (c) an output circuit coupled to said collector electrode of each of said devices, (d) third and fourth series coupled current translating devices for coupling together said emitter electrodes of said first and second translating devices to provide a current path for said input signal and to limit the amount of current through said path, said third device providing a low impedance to current flow in a first direction and a high impedance to current flow in the opposite direction and said fourth device providing a high impedance to current flow in said first direction and a low impedance to current flow in said opposite direction, and (e) means coupling the junction of said third and fourth current translating device to a reference potential.

2. A difference amplifier as in claim 1 wherein said third and fourth devices are diodes.

3. A difference amplifier as in claim 2 wherein said diodes have a temperature-resistivity characteristic whereby an increase in temperature provides an increase in resistivity of said diodes.

4. A difference amplifier as in claim 3 further including:

(a) bias control means coupled between said diodes for determining the amount of current flow through said diodes.

References Cited

UNITED STATES PATENTS

| | | | |
|---|---|---|---|
| 3,168,709 | 2/1965 | Sikorra | 330—30 |
| 3,210,672 | 10/1965 | Cox et al. | 330—30 X |
| 3,258,704 | 6/1966 | Wittman | 330—30 X |
| 3,165,725 | 1/1965 | Kelcourse. | |
| 3,304,512 | 2/1967 | McMillan | 330—69 X |

FOREIGN PATENTS

| | | |
|---|---|---|
| 529,044 | 11/1940 | Great Britain. |
| 1,003,319 | 10/1965 | Great Britain. |
| 1,154,520 | 9/1963 | Germany. |

ROY LAKE, *Primary Examiner.*

NATHAN KAUFMAN, *Examiner.*